(12) United States Patent
Diaz

(10) Patent No.: US 6,264,745 B1
(45) Date of Patent: Jul. 24, 2001

(54) POWDER SPRAY APPARATUS

(75) Inventor: William Diaz, Chicago, IL (US)

(73) Assignee: Wagner Systems, Inc., Glendale Heights, IL (US)

( * ) Notice: Subject to any disclaimer, the term of this patent is extended or adjusted under 35 U.S.C. 154(b) by 0 days.

(21) Appl. No.: 09/332,622

(22) Filed: Jun. 14, 1999

(51) Int. Cl.[7] .................................................. B05B 1/28
(52) U.S. Cl. ............................................. 118/326; 454/53
(58) Field of Search ............................... 454/54, 53, 50, 454/51, 52; 55/294, 302; 118/326, DIG. 7

(56) References Cited

U.S. PATENT DOCUMENTS 4,378,728 * 4/1983 Berkmann ............................... 454/53
5,107,756 * 4/1992 Diaz ....................................... 454/53

* cited by examiner

Primary Examiner—Harold Joyce
Assistant Examiner—Derek S. Boles
(74) Attorney, Agent, or Firm—Fitch, Even, Tabin & Flannnery

(57) ABSTRACT

A powder spray apparatus and method for operating it comprise a spray booth having a floor. A spray gun is associated with the spray for directing a spray of powder of a particular color toward a workpiece. Overspray is redirected by limiting exhaust air from the flowing into an air-entrained powder separation system. An inlet to the separation system includes a sump for capturing powder from the floor of the spray booth when the floor is cleaned during a color changeover. The powder deposited in the sump is recirculated to a powder reservoir for later reuse.

12 Claims, 5 Drawing Sheets

POWDER SPRAY APPARATUS

FIELD OF THE INVENTION

This invention relates to recovery of sprayed powder entrained in air and, more particularly, to recovery of overspray paint powder from an electrostatic paint booth.

BACKGROUND OF THE INVENTION

As disclosed in U.S. Pat. No. 5,107,756 an electrostatic paint system consists of a paint booth or enclosure in which a coating such as paint powder is applied to parts, a conveyor for carrying parts into and out of the booth, and an electrostatic paint applying system. The paint applying system includes a powder spraying device which imparts a velocity to the paint powder particles which directs its, them toward the device to be painted, places an electrical charge on the powder particles, creates an electrical field between the device being painted and ground, and meters the powder. Electrostatically-charged powder particles are attracted to and have an affinity for the grounded object to be painted since the grounded object assumes a polarity opposite that of the powder-spraying device. The charged powder particle, acted upon by the electrical field, can be deflected from its original trajectory in the direction of the grounded object.

In an automatic electrostatic system, the spraying device may be mounted in a fixed position, attached to a gun mover device that provides reciprocating motion, attached to a robot that imparts a predetermined complex motion, or manipulated manually. An electrostatic adhesion system greatly increases powder transfer efficiency from the gun to the surface to be coated as compared to a non-electrostatic device.

The paint powder that does not adhere to the part is generally referred to as overspray. Overspray comprises powder that misses the part, rebounds from the part surface, and powder electrostatically deflected to other grounded surfaces such as spray booth metal components and article conveyors. Most overspray is entrained in the spray booth exhaust air.

Electrostatic powder spray users generally use either a cyclone type powder recovery system or a cartridge filter type powder recovery system. Cartridge systems are very efficient, recovering nearly all powder overspray for reuse. In comparison, conventional cyclones alone normally recover only approximately 80% to 90% of oversprayed powder. A scrap collector is employed to trap the remainder of the powder. Powder from the scrap collector is speckled and therefore must be disposed of. Thus, cyclones are not as efficient as cartridges. In long runs, this difference in efficiency can result in a substantial difference in powder usage and, accordingly, cost of operation. However, cyclones are advantageous in that, unlike cartridges, cyclones can be completely cleaned between successive runs of differing colors in a relatively short time. Thus, since one cyclone can be easily cleaned after a color run, it is not necessary to employ separate cyclones for each color to be run. Accordingly, short runs of specialized colors can be performed much more economically than with cartridge systems, which require separate cartridges for each specialized color to be run.

As shown in the '756 patent a system was developed which allowed a diverted door or the like to select an exhaust path either directly into a scrap cartridge filter assembly employing a plurality of filter cartridges 42 or first through an inlet duct 70 to a cyclone 73 where most of the particulate are removed and air including only very fine particulate are expelled from an outlet duct 94 back to the cartridge filter cartridge 42 following which air is exhausted through a final filter 84 via a fan 82. In particular the system shown in FIG. 8 includes a manifold assembly having a relatively large inlet for receiving air from the air including powder and train therein from the spray booth passing it to the cyclone and then back to the cartridge filter or in the alternative directly to the cartridge filter. The patent also teaches the use of adjustable baffles in combination with a cartridge filter 42 to control the flow of air within the spray booth for efficient transfer of powder to the workpiece 12 within the booth.

The existing system, however, could be improved as to its ease of clean out and as to the control of air flow therethrough. Typically when a color change is to be made the bottom of the spray booth must be cleaned by hand. This involves someone actually going in and manually removing powder spray particles which have settled on the floor of the booth during multiple spraying operations of multiple workpieces. Typically the powder has to be scooped out of the booth and disposed of. This may take 45 minutes or more, a substantial down time particularly when color changes are frequent when runs are short.

In addition, a portion of the powder resting on the booth floor would ultimately reach the cyclone or the cartridge filters for automatic recycling via the feed line 54 back to the powder reservoir 56. Because of the extensive manual labor involved in the color change within the booth this leads to substantial down time of the booth which might otherwise be used in a productive capacity.

What is needed is a method and apparatus for rapidly color changes by enabling efficient clean out of the spray booth as well as recycling of the powder left on the booth floor after a run of a particular has been completed.

SUMMARY OF THE INVENTION

An electrostatic, adhesion powder spray paint apparatus is provided which provides minimal overspray with rapid cleanout of the spray booth during color changeover.

In running high volume or commonly used colors, the cyclone module is isolated from the spray booth apparatus, and the overspray from the spray booth is drawn directly into a conventional cartridge cabinet in a conventional manner. That is, the overspray powder-air mixture is drawn into a conventional, dedicated cartridge cabinet and drawn radially through the cartridge filters in the cartridge cabinet which separate the powder from the air. Overspray powder accumulated on the exterior of the cartridge filters is pulsed off the filters by short pulses of reverse flowing air, into a hopper located at the bottom of the cartridge module where the powder mixes with the replenished virgin powder and is pumped back to the spray guns. As stated above, since the cartridge cabinet is dedicated to that particular color, the recovered powder pulsed off the filters is untainted by other colors and therefore reusable. Such an arrangement allows recycling of virtually all overspray.

In changing to a secondary color, the air path from the spray booth is diverted such that overspray powder is drawn from the spray booth directly into the cyclone, initially bypassing the cartridge module. The centrifugal force within the cyclone throws the particulate against the cyclone wall which separates the majority of the powder from the air-powder mixture. The fine particulate not separated in the cyclone is drawn out of the cyclone through its upper end into a scrap collector, which may be a cartridge booth dedicated to collection of scrap.

The powder recovery apparatus constructed in accordance with the present invention provides the particular advantage of flexibility. It has the ability to rapidly switch to running of a color which is disposable without the need to clean any duct work. This is accomplished by connecting a cartridge cabinet and connecting it whereby the air-powder mixture from the spray booth is first drawn into a cyclone and then fed to the cartridge cabinet wherein the remaining fine powder is separated by the cartridge filters.

The apparatus includes an inlet duct directly feeding to the cyclone for high volume applications where it is desired that the cyclone perform the initial separation. An alternative inlet duct feeds directly to the cartridge filter cabinet. In normal use one of the inlet ducts is blocked while the other is open. For instance, the cartridge cabinet inlet duct may be blocked and a baffle assembly may be put over the cyclone inlet duct. The baffle assembly is adjustable and includes a pair of slotted plates or baffles, one of which is slidable with respect to the other. Each of the slotted plates defines a plurality of open slots. The effective slot opening for admitting air and powder mixtures may be varied by displacing one of the slotted plates with respect to the other. The slotted plates may be held in fixed but adjustable positions by screws, hangers or the like which attach them to the inlet duct of the cyclone. This reduces the effective air velocity going into the cyclone and prevents substantial air sweep around a workpiece within the spray booth to prevent undue amounts of air-entrained powder from being swept out of the spray booth and away from the workpiece during a painting operation and thereby reduces powder waste.

In addition, in order to allow rapid clean out of the spray booth a sump is provided immediately below the cyclone inlet duct. The sump includes a feed through connection. The sump has at least on sloping wall and includes a feedback connection to the powder reservoir for recycling the spray powder. In use the spray booth may be rapidly cleaned when switching from one color to another by sweeping powder which has gathered on the bottom of the spray booth toward the adjustable baffles of the cyclone duct inlet. The powder is drawn in by the air stream. In addition may be pushed by a squeegee or the like through the lowermost opening in the adjustable baffles where the largest powder particles or most dense will fall into the sump. The feed line connection at the bottom of the hopper then draws the particles to be recycled out and then recycles them into the powder reservoir which then may be changed out during a gun changeover to another color. Any powder particles that are resuspended in air during the cleaning will be drawn into the inlet duct of the cyclone. Most of those particles will be separated out by the cyclone and recycled and the remainder of which will be captured in the cartridge filter.

Thus, the system provides the ability to handle either high volume cyclone applications or low volume cartridge filter applications while allowing for rapid clean out of the sprayed powder from the booth and control of the amount of air-entrained powder being swept out of the booth in order to reduce wasted powder spray.

Further advantages will become apparent as the description proceeds and the features of novelty which characterize this invention will be pointed out with particularity in the claims annexed to and forming a part of the specification.

BRIEF DESCRIPTION OF THE DRAWINGS

FIG. 6 is a front elevational view of the cyclone and cartridge filter system showing details of the baffles and sump with a cyclone inlet open and a cartridge filter inlet open;

FIG. 8 is a front elevational view of the cyclone and cartridge filter system with the cyclone inlet blocked and the cartridge filter inlet open;

DETAILED DESCRIPTION OF THE PREFERRED EMBODIMENTS

Figure 1:
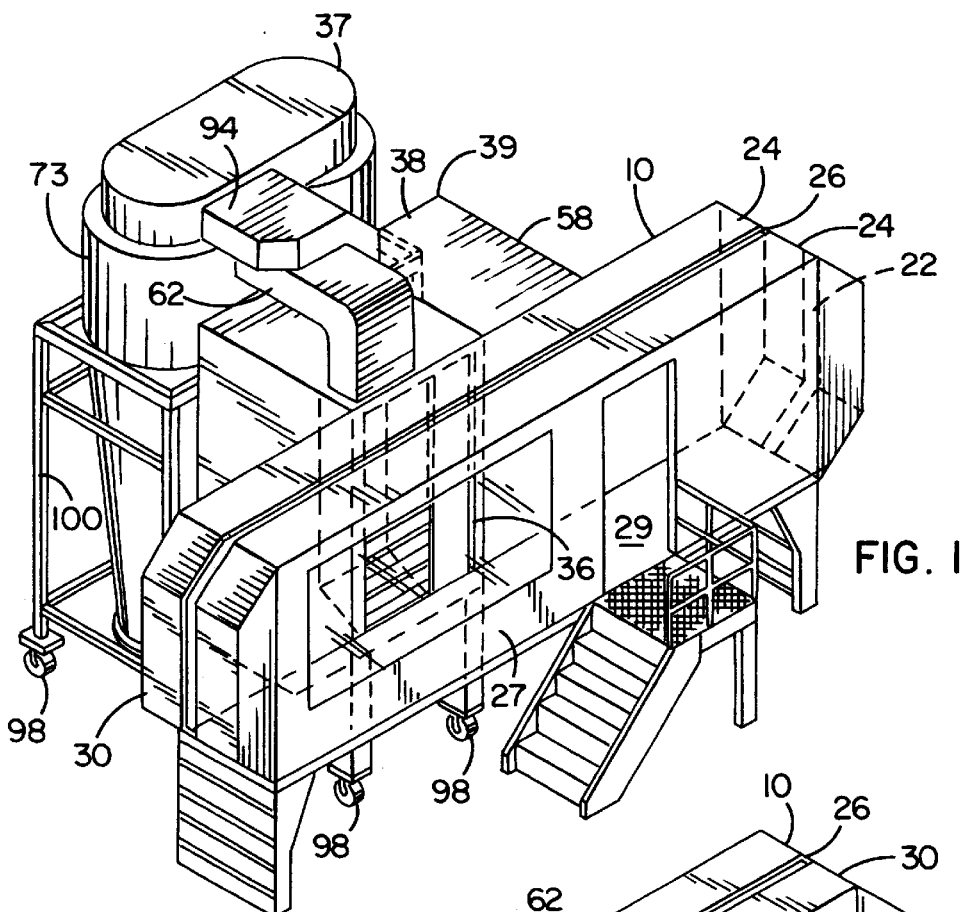
FIG. 1 is a perspective view of a spray booth apparatus embodying the present invention.
Figure 2:
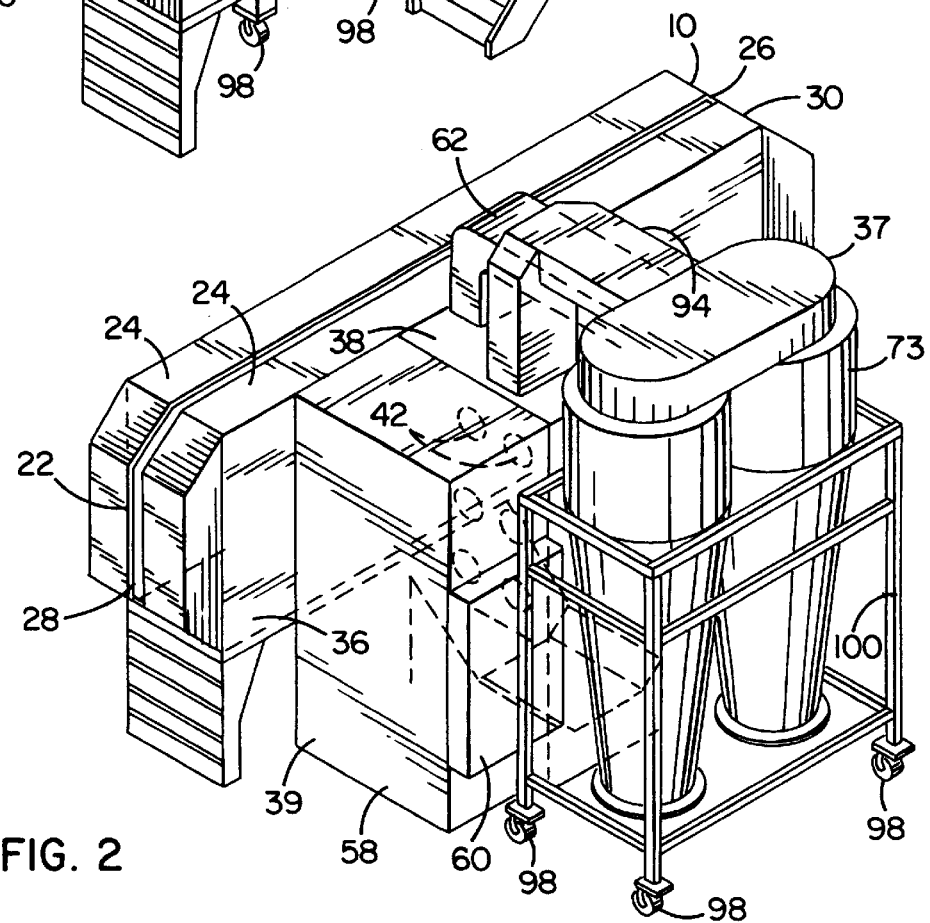
FIG. 2 is a perspective view of a rear portion of the spray booth apparatus shown in FIG. 1 showing details of a filter cartridge system and a cyclone system.

As shown in the drawings for purposes of illustration, the invention is embodied in an electrostatic, adhesion powder spray apparatus. Referring initially to FIGS. 1 and 2, the powder spray apparatus indicated generally at 10 is illustrated to show one arrangement of apparatus for carrying out the present invention. While the powder spray apparatus 10 is described herein in connection with a powder spray painting operation, the usefulness of the powder apparatus 10 embodying the invention is not limited to painting operations, but may extend to various other types of operations as well.

Figure 3:
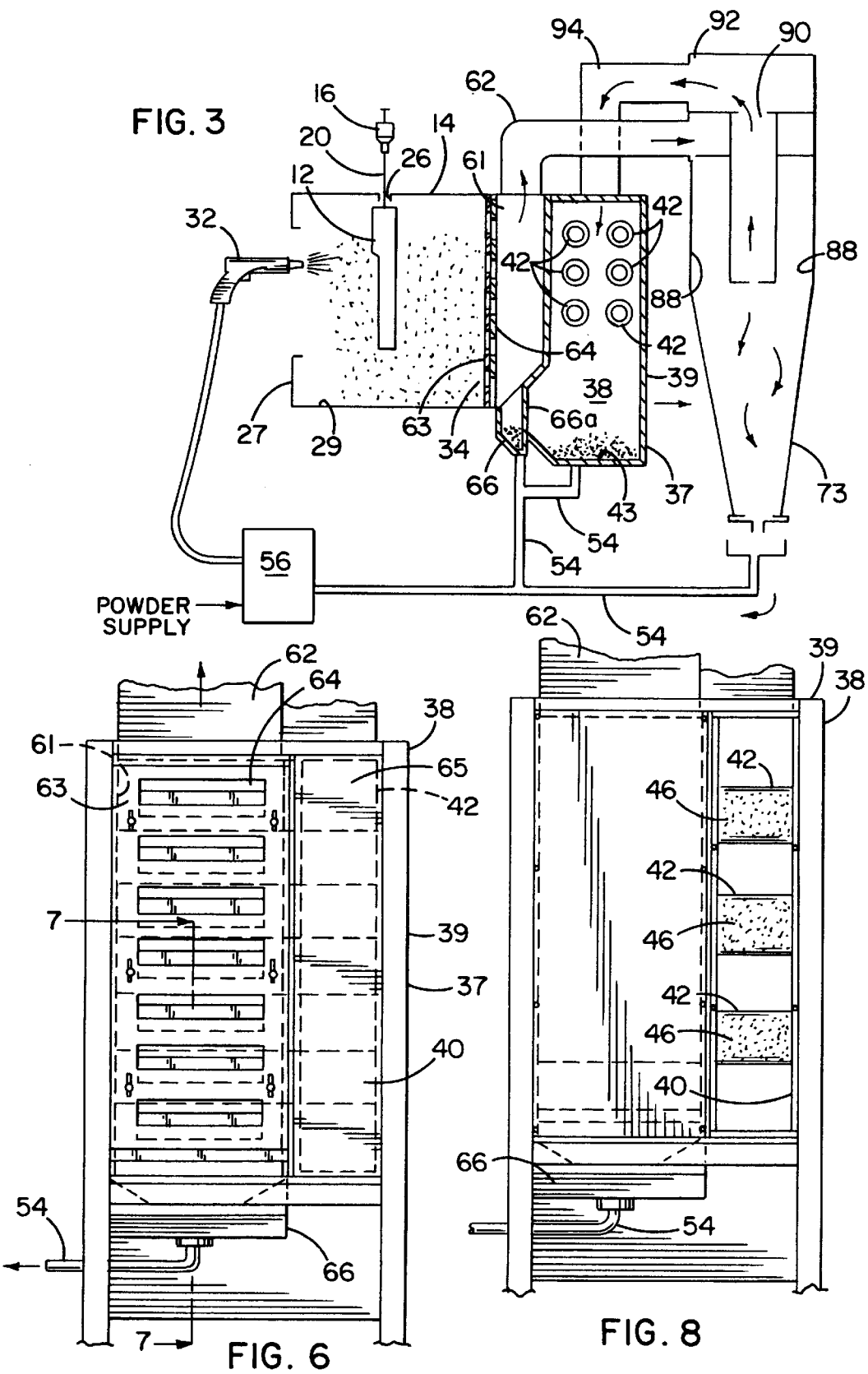
FIG. 3 is a schematic showing of the spray booth system shown in FIGS. 1 and 2.
Figure 4:
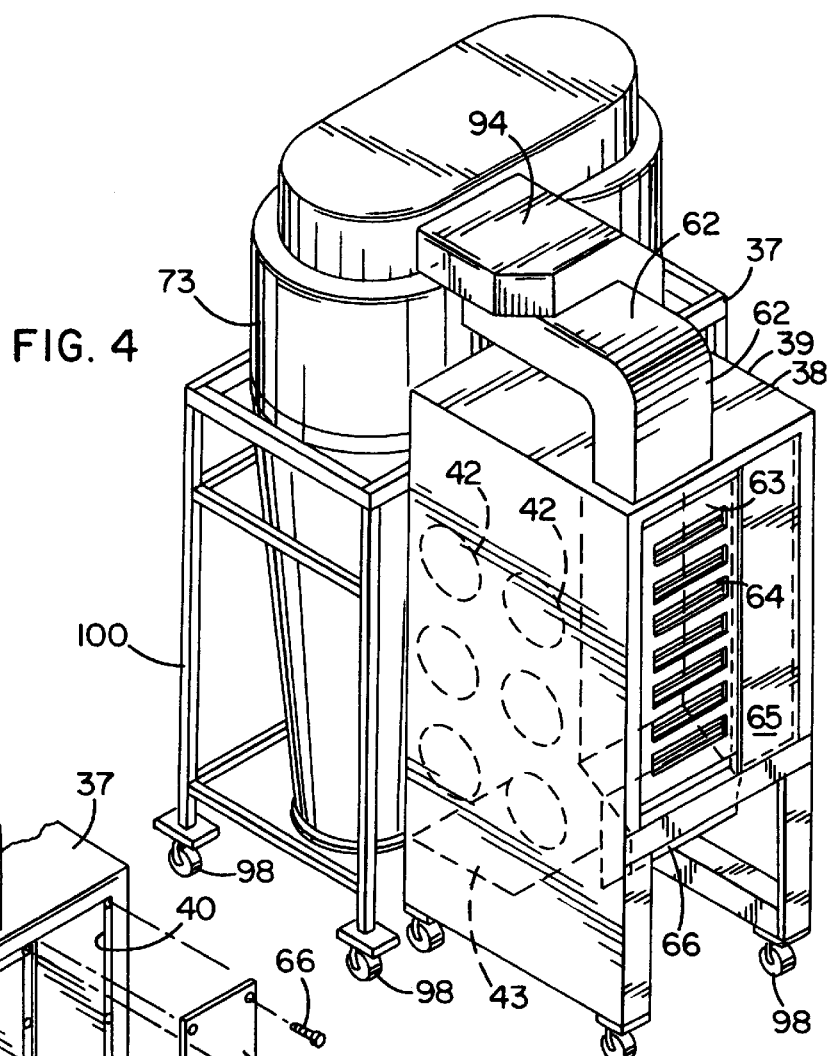
FIG. 4 is a perspective view of the cartridge filter and cyclone system separated from other portions of the spray booth apparatus shown in FIG. 1 showing details of a baffle system and a powder collecting sump associated therewith.

As seen in FIG. 3, a workpiece 12 is transported into a spray housing spray booth 14 along a conventional conveyor 15, such as a wheel 16 and guide rail 18 assembly. The workpiece 12 depends from the conveyor 15 by one or more electrically conductive wires or hangers 20 so that the workpiece 12 is maintained at ground potential as it travels through the spray housing 14.

Referring to FIG. 2, the workpiece 12 enters the spray housing 14 through a spray housing inlet 22 which is tapered downward from a roof 24 of the spray housing 14 so as to prevent migration of sprayed particulate therethrough. This inlet 22 in combination with an inward air flow through the inlet 22, as discussed below, has been found to be sufficient to prevent escape of particulate through the spray housing inlet 22. A transporting slot 26 is provided in the roof 24 of the spray housing 14 which runs along the length of the spray housing 14 from an inlet end 28 to an outlet end 30 thereof to accommodate the depending wires 20 which carry the workpieces 12 through the spray housing 14.

As the workpiece 12 passes through the spray housing 14, it is sprayed with the desired particulate. In one embodiment of the invention, the particulate is paint powder which is sprayed on the workpiece 12 by a spray gun 32 which is capable of providing a generally uniform particulate or powder spray comprising a plurality of paint powder particles. The spray gun 32 operates in a conventional manner, well known in the art, to electrostatically apply the powder to the workpiece 12. That is, the spray gun 32 is charged to a predetermined negative potential and imparts that negative potential to the particulate sprayed therefrom. The negatively-charged particulate or powder spray is then electrostatically attracted to the workpiece 12 under the influence of the electrostatic field established by the polarity and potential difference between the electrostatic spray gun 32 and the workpiece 12. A plurality of spray guns 32 may be employed which may be operated manually or automated, wherein the guns 32 are commonly situated on opposing sides of the workpiece 12 as it passes through the spray housing 14. An exhaust port 34 is provided in a rear wall 36 of the spray housing 14 through which the particulate entrained exhaust air from the spray housing 14 passes.

In operation, not all sprayed particulate adheres to the workpiece 12. Sprayed particulate which does not adhere to the part is referred to as "overspray". Overspray is comprised of particulate which misses the workpiece, particulate which rebounds from the workpiece surface, and particulate electrostatically deflected to other grounded surfaces such as spray booth metal components and the like. The majority of overspray powder is entrained in the spray housing exhaust air. Great savings are attainable by the ability to recover and reuse this entrained overspray particulate. It is important in such particulate recovery apparatus, however, that particulate used and recovered in one run not be intermixed with any differing particulate run in a subsequent run. Even slight intermixing of colors results in an undesirable speckling effect when the captured overspray is reused. It is desirable to provide such apparatus wherein color changes can be made rapidly while still maintaining separation of successively run colors. Apparatus constructed in accordance with the present invention provides significant improvement over prior designs in meeting these conflicting objectives.

As shown in FIGS. 4 through 7, separator system 37 having a cyclone powder separator and a cartridge filter powder separator comprises a cartridge cabinet 38. The cartridge cabinet 38 comprises a cartridge housing 39, a cartridge cabinet inlet 40, and a plurality of cartridge filters 42. The particulate entrained air from the spray housing 14 is drawn through the cabinet inlet 40. The particulate entrained air then passes through a series of cartridge filters 42, such as that which separate the particulate out of the airflow. Thus in operation, air is drawn from the interior of the cartridge filter 42 through an airflow opening such that the particulate entrained air flows radially through the cartridge filter 42 into an interior 47 of the cartridge filter 42. The outer filter 46 allows airflow therethrough with the particulate trapped by the filter 46 such that the particulate accumulates on the outer surface of the filter 46. Reverse pulses of air through the cartridge filter 42 are employed to cause the particulate accumulated on the outer filter 46 to fall therefrom into the bottom of the cartridge cabinet 39.

The particulate accumulated at the bottom 43 of the cartridge cabinet 39 can be removed manually or automatically, and subsequently recycled back to the spray gun 32. A feed line 54 extends into the bottom of the cartridge cabinet 39, through which particulate is pumped into a hopper 56 and subsequently pumped to the spray gun 32. Virgin powder can be loaded into either the hopper 56 or mixed with recycled powder directly in the bottom of the conventional cartridge cabinet 39. While only one feeder line 54, hopper 56 and spray gun 32 are shown, it is appreciated that several such components can be utilized simultaneously in large volume applications.

As shown in FIG. 2, an exhaust fan housed in a fan cabinet 58 induces the desired airflow through the powder spray apparatus 10. Clean air is drawn in through the spray housing inlet 22 and drawn through the spray housing 14 wherein particulate is entrained in the airflow. The particulate entrained air is then drawn through the exhaust port 34 and into the cartridge cabinet 39 or a cyclone wherein air flows radially through the cartridge filters 42 with the particulate separated out and pulsed off the filters to the cabinet floor. The filtered air drawn through the cartridge filters 42 then passes through the fan cabinet inlet 59, into the fan cabinet 58, and through a final filter 60, to comply with occupational safety and health requirements, before being expelled back into the plant.

Figure 5:
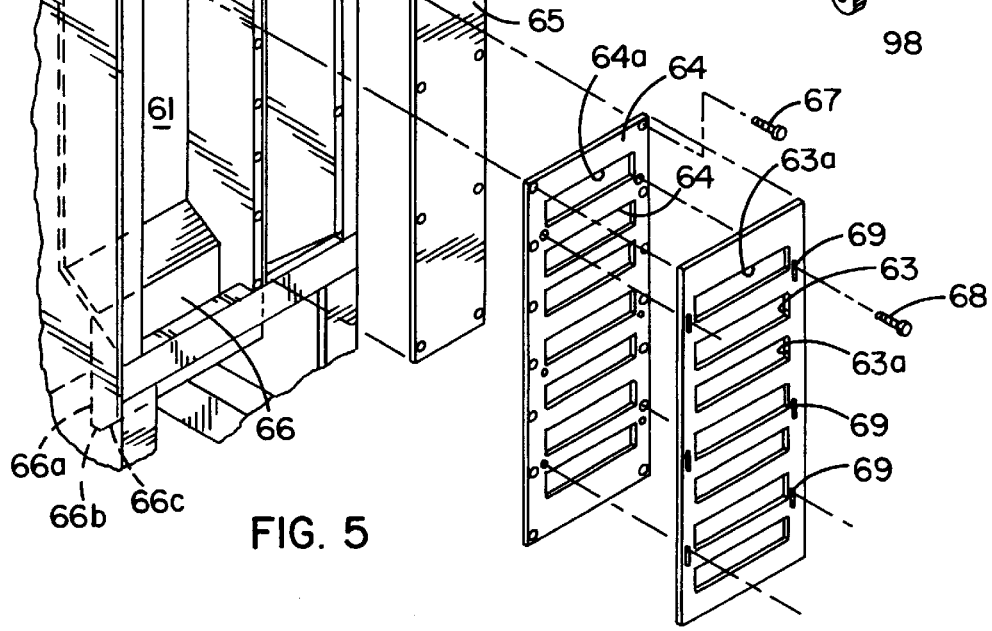
FIG. 5 is an exploded perspective view of an entrance portion to the cartridge filter and cyclones showing details of the baffle arrangement and the sump.

As shown in FIGS. 5 and 6, the separator 37 includes the filter cartridge inlet 42 as well as a cyclone inlet 61. The cyclone inlet 61 is in communication with a cyclone bypass duct 62 and has an outer baffle plate 63 and an inner baffle plate 64 at least particularly covering the inlet 61 for reducing air flow to the cyclone and reducing overspray by modifying air exchange in the spray booth. A panel 65 covers the inlet 40 to the cartridge cabinet. The panel 65 is attached to the cartridge cabinet inlet 40 in sealing fashion by plurality of screws one of which is shown as screw 66. The panel 65 prevents any airflow from exiting the spray booth directly into the cartridge filter system itself. The air must first pass through the outer baffle 63 the inner baffle 64, and then into the cyclone inlet 61, through the bypass duct 62 and then into a pair of cyclones 73. Immediately beneath the inlet 61 is a powder capturing sump 66 comprising a back wall 66a, a bottom wall 66b, and a tapered front wall 66c. Attached to the sump 66 is the feed line 54 for recirculating powder trapped in the sump back to the powder supply 56.

In operation the inner baffle plate 64 and the outer baffle plate 63 are secured to the cyclone inlet 61 by fasteners 67 and 68 with the outer baffle plate 63 being movable with respect to the inner baffle plate 64 through the use of slotted openings 69. The inner baffle 64 includes a plurality of baffle slots 64a for admitting air entrained with powder from the spray booth 14. The baffle 63 includes a plurality of baffle slots 63a also for admitting air. In operation the baffles are staged with respect to one another to reduce the effective slot opening in an adjustable fashion. This controls the amount of air exiting the spray booth 14 and entering cyclone the inlet 61 in order to control the amount of overspray which travels around the workpiece 12. It also prevents substantial ducting of powder spray out of the booth 14 and around the workpiece 12.

Figure 7:
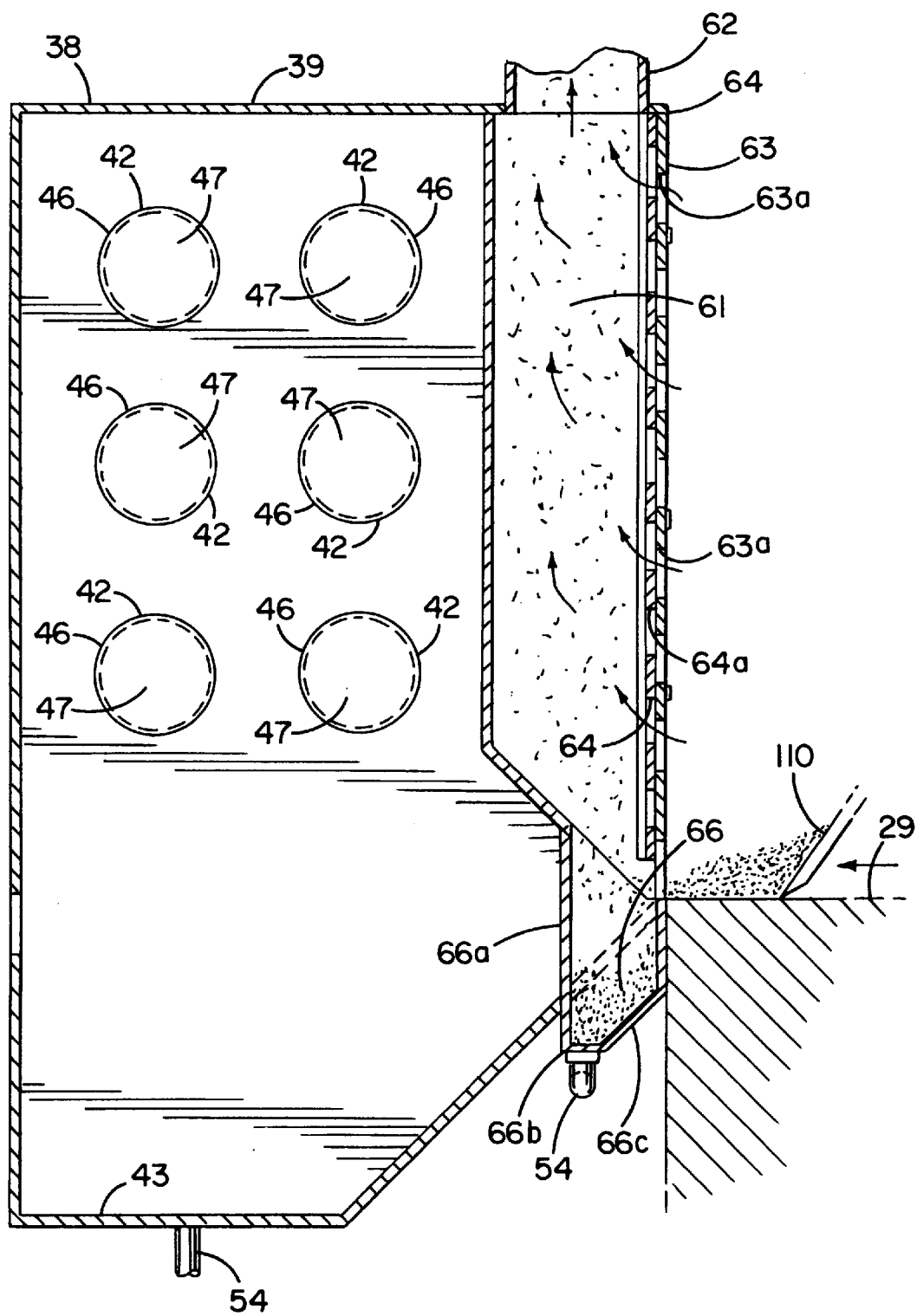
FIG. 7 is a sectional view of taken substantially along line 7—7 of FIG. 6 showing details of air flow through the baffles and trapping of material in the sump.
Figure 9:
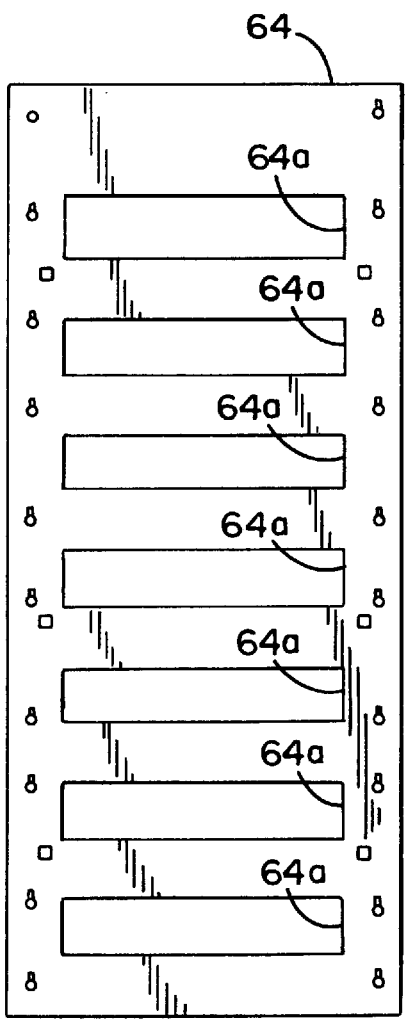
FIG. 9 is an elevational view of a first baffle.
Figure 10:
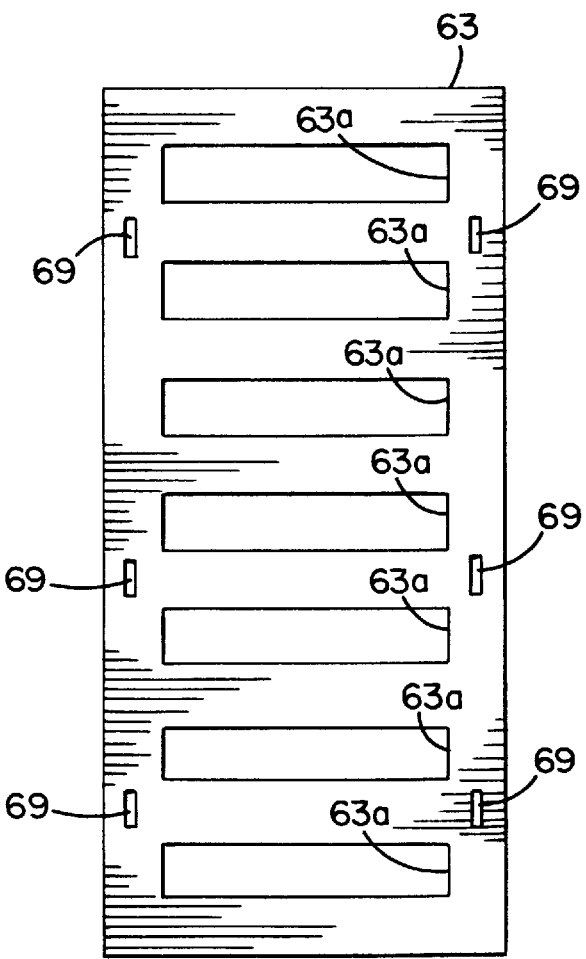
FIG. 10 is an elevational view of a second baffle.

In addition as shown in FIG. 7, the sump 66 is provided so that during cleanout a person operating a squeegee 110 or the like may apply the squeegee 110 to the floor 29 of the spray booth 14 and as the cyclone 73 is operating and drawing air through the outer baffle 63, the inner baffle 64, and into the inlet 61 and the bypass duct 62, a portion of the particles may be carried upwardly and into other portion of the cyclone 73. Heavier powder particles will drop into the sump 66. The tapering wall 66c of the sump 66 will guide the particles to the narrow sump bottom 66b where they will be drawn off through the feed line 54 and back to the reservoir 56. This is done prior to the reservoir 56 and gun 32 either being cleaned or being changed out. This greatly increases the speed with which the spray booth can be cleaned out and saves on powder which would normally be lost during such cleanout operations.

When the apparatus is run in bypass mode utilizing one or more cyclone separators 73, the cyclone separators 73 recover between approximately 80% and 90% of particulate from the airflow which can then be reused is run in bypass mode wherein the cartridge cabinet inlet 40 is blocked with a panel 65 so that the particulate entrained airflow from the spray housing 14 passes into the bypass duct 70 and subsequently into the inlet duct 86 of the cyclone separator 73.

A dual cyclone separator 73 is employed wherein the cyclone inlet duct 86 splits the particulate entrained airflow and directs the two portions into the respective, adjacent cyclones.

As shown in FIG. 3 the inlet duct 62 of the cyclone separator 73 is scrolled so as to impart a predetermined centrifugal force to the particulate entrained air passing therethrough. The centrifugal force propels the particulate against the side walls 88 of the cyclone separator 73 which separates the majority of particulate from the airflow. This separated particulate falls to the bottom of the cyclone and accumulates thereat until removed for reuse, which can be by either manual or automated means. The remaining fine particulate, not separated out by the centrifugal force of the cyclone, is drawn upwardly through a central, baffled cyclone exhaust opening 90. In conventional cyclone separator operation, the fine particulate exhausted through the cyclone exhaust opening 90 may be collected by a bag house or another cartridge filter cabinet.

In accordance with the present invention, the fine particulate from the cyclone separator is discharged into the cartridge cabinet 38 through a cyclone exhaust duct 92 in communication with a scrap cabinet bypass inlet duct 94. The opening of the cyclone exhaust duct 92 and bypass inlet duct 94 are the same size so that an airtight seal can be effected between the two ducts when adjacent one another. Similarly, the bypass duct outlet 82 is proportioned to be the same size as the split cyclone inlet duct 86 such that the mating outer edges of the mating ducts form an airtight seal.

The cartridge cabinet 38 serves to filter out the fine particulate before the airflow is discharged into the plant. However, the large majority of air entrained particulate which is separated in the cyclone separators 73 is capable of reuse. Powder accumulated at the bottom of the cyclones 73 is transported manually or mechanically into a hopper or feeder 56 whereafter the powder is mixed with virgin powder and pumped back to the spray gun 32 for reuse. Thus, the air discharged from the exhaust fan 82 and exhaust filters is essentially free of paint spray except for a minute percentage of paint spray.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A powder spray apparatus for spraying workpieces with particulate comprising:
    a spray booth having a floor, the spray booth receiving workpieces to be sprayed with powder, a portion of the powder being entrained in air in the spray booth, another portion of the powder settling on the floor; and
    a cyclone particulate separating system for separating spent powder from the air in which it is suspended, the cyclone particulate separating system comprising a cyclone inlet directing airflow having particulate entrained therein to a separator, the cyclone particulate separating system also having a sump positioned at the cyclone inlet for receiving particulate resting on the floor of the spray booth;
    a return line connected to the sump for retrieving the particulate therein; and
    a particulate hopper for holding particulate to be supplied to at least one spray gun, the particulate hopper being in communication with the sump to receive recovered particulate for reuse.

2. A powder spray apparatus for spraying workpieces with particulate according to claim 1 wherein the sump has at least one sloping wall for guiding powder to the return line.

3. A powder spray apparatus for spraying workpieces with particulate according to claim 1 wherein the sump is tapered.

4. A powder spray apparatus for spraying workpieces with particulate, comprising:
    a spray booth for receiving workpieces to be sprayed with powder, a portion of the powder being entrained in air in the spray booth, the spray booth having a floor;
    a particulate separating system for separating at least a portion of air-entrained powder from air, the particulate separating system having a sump positioned at a particulate separating system inlet for receiving particulate resting on the floor of the spray booth;
    an air passageway for directing airflow from said spray booth to one of said particulate filter systems; and
    an airflow control having a pair of baffles one of which is displaceable with respect to the other for controlling the rate of air flow through the spray booth to reduce overspray.

5. A powder spray apparatus according to claim 4 in which the air flow control is located near the air passageway.

6. A powder spray apparatus according to claim 4 in which the air flow control blocks a portion of the air flow entering the air passageway.

7. A powder spray apparatus according to claim 6 in which the baffles define a plurality of air flow openings.

8. A method for recovering overspray particulate from a floor of a spray booth of a powder spray apparatus, comprising:
    applying low pressure to an exhaust of the spray booth;
    separating particulate from the exhaust;
    moving particulate collected on the floor of the spray booth toward the exhaust opening;
    capturing at least a portion of the particulate in a sump positioned at a particulate separator inlet; and
    recycling the captured particulate to a particulate supply.

9. A method for recovering overspray particulate from a spray booth of a powder spray apparatus according to claim 8 in which the recycling further comprises transporting the particulate from the sump to the particulate supply.

10. A method for recovering overspray particulate from a spray booth of a powder spray apparatus according to claim 8 wherein the low pressure is below ambient pressure within the spray booth.

11. A method for recovering overspray particulate from a spray booth of a powder spray apparatus according to claim 8 wherein the particulate is manually transported to the exhaust opening for transport to the sump.

12. A method for recovering overspray particulate from a spray booth of a powder spray apparatus according to claim 8 wherein a portion of the particulate that becomes entrained in air in the booth during clean out is transported to a particulate separator for recovery of at least a portion thereof from the air.

* * * * *